United States Patent
Meng et al.

(10) Patent No.: US 9,048,655 B2
(45) Date of Patent: Jun. 2, 2015

(54) ESD PROTECTION SCHEME USING I/O PADS

(71) Applicant: Taiwan Semiconductor Manufacturing Co., Ltd., Hsin-Chu (TW)

(72) Inventors: Qingchao Meng, Shanghai (CN); Lei Pan, Shanghai (CN); Shao-Yu Chou, Chu Pei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/675,547

(22) Filed: Nov. 13, 2012

(65) Prior Publication Data

US 2014/0118869 A1    May 1, 2014

(30) Foreign Application Priority Data

Oct. 29, 2012  (CN) .......................... 2012 1 0421461

(51) Int. Cl.
| | |
|---|---|
| H02H 9/00 | (2006.01) |
| H02H 9/04 | (2006.01) |
| H01C 7/12 | (2006.01) |
| H02H 1/00 | (2006.01) |
| H02H 1/04 | (2006.01) |
| H02H 3/22 | (2006.01) |
| H02H 9/06 | (2006.01) |

(52) U.S. Cl.
CPC ............... *H02H 9/043* (2013.01); *H02H 9/046* (2013.01)

(58) Field of Classification Search
CPC ................ H01L 27/0248; H01L 23/60; H01L 2924/0014
USPC .......................................................... 361/56
See application file for complete search history.

(56) References Cited

U.S. PATENT DOCUMENTS

2008/0247104 A1 * 10/2008 Kwak ............................ 361/56

* cited by examiner

*Primary Examiner* — Dharti Patel
(74) *Attorney, Agent, or Firm* — Eschweiler & Associates, LLC

(57) ABSTRACT

Some embodiments relate to an IC that includes an ESD-susceptible circuit. The IC includes a number of IC pads that are electrically coupled to respective nodes on the ESD-susceptible circuit. The IC pads are electrically accessible from external to the IC, and include one or more power supply pads and one or more I/O pads. The IC also includes a number of ESD protection devices coupled to the plurality of IC pads, respectively. A trigger circuit on the IC is configured to detect an ESD event impingent on a power supply pad and, in response to the detection, to trigger concurrent shunting of energy of the ESD event over both an ESD clamp element of an I/O pad and an ESD clamp element of the power supply pad. Other embodiments are also disclosed.

18 Claims, 4 Drawing Sheets

ESD PROTECTION SCHEME USING I/O PADS

CROSS REFERENCE TO RELATED APPLICATIONS

This application claims priority to Chinese Patent Application Number 201210421461.7 filed with the Chinese Patent Office on Oct. 29, 2012, which is hereby incorporated by reference.

BACKGROUND

An electrostatic discharge (ESD) pulse is a sudden and unexpected transfer of energy to an electronic device from an outside body (as approximated by using a human body model (HBM) or machine model (MM)) or to an outside body from an electronic device (as approximated by using a charged device model (CDM)). ESD event scan damage electronic devices, for example by "blowing out" a gate oxide of a transistor in cases of high voltage or by "melting" an active region area of a device in cases of high current, causing junction failure. If devices are damaged by an ESD event, the electronic product can be rendered less operable than desired, or can even be rendered inoperable altogether.

DETAILED DESCRIPTION

Figure 1:
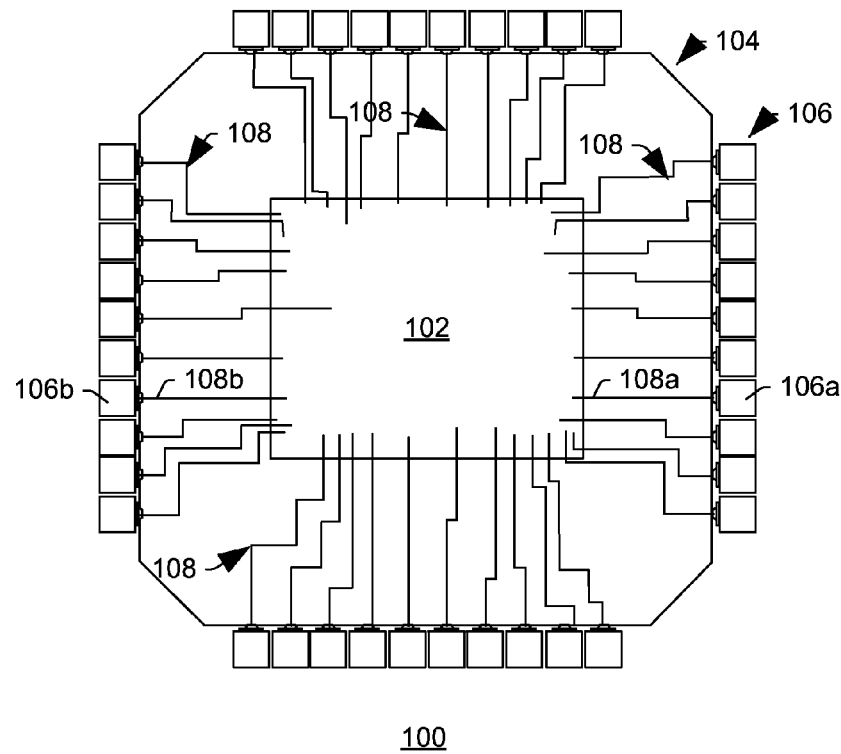
FIG. 1 shows an example of an integrated circuit that includes an ESD-susceptible circuit arranged within a pad frame.

One or more implementations of the present invention will now be described with reference to the attached drawings, wherein like reference numerals are used to refer to like elements throughout. The drawings are not drawn to scale.

FIG. 1 shows an example of an ESD-susceptible circuit 102 (e.g., one or more semiconductor devices) formed on an integrated circuit (IC) 100. The circuit 102 is surrounded by a pad frame 104 which is formed on the same die as the ESD susceptible circuit 102. The pad frame 104 includes a number of IC pads 106, such as landing pads or solder bumps, which are disposed around an outer periphery or outer surface of the pad frame 104 and which are coupled to respective nodes on the ESD susceptible circuit 102 via conductive leads 108. For example, IC pad 106a is coupled to a node on the IC 102 via conductive path 108a; while IC pad 106b is coupled to a node on the IC 102 via conductive path 108b. The IC pads 106 can include a number of power supply pads (e.g., VDD supply pads and a VSS supply pads) as well as a number of I/O pads which transfer signals to and/or from the circuit 102.

Figure 2:
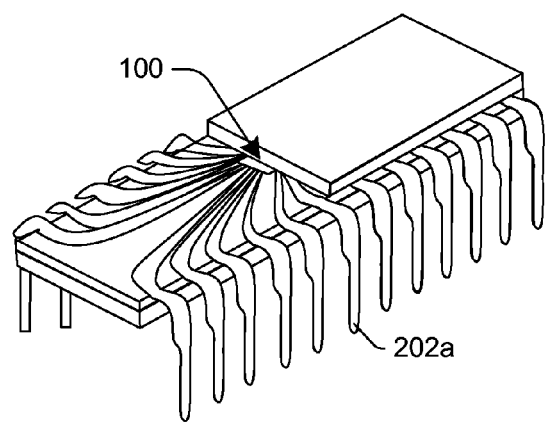
FIG. 2 shows an example of a dual-in-line package for housing an integrated circuit, although many other of packages are also contemplated as falling within the scope of this application.

FIG. 2 shows an example where the IC 100 of FIG. 1 is mounted in a dual in-line package (DIP) 200, although the IC 100 could also be mounted in any number of other types of packages, including but not limited to: flip-chip packages, ball grid array packages, contactless packages, through-hole packages, and surface mount packages. In FIG. 2's example, the IC pads (e.g., 106a) are connected to respective pins (e.g., pin 202a) on the DIP package 200, thereby allowing the IC 100 to connect to external circuitry such as a breadboard or printed circuit board, for example, in a relatively safe and reliable manner.

Although the IC pads 106 allow the ESD susceptible circuit 102 to be connected to one or more external circuits, the pads 106 similarly make the ESD susceptible circuit 102 susceptible to ESD events from the external environment. To protect the ESD-susceptible circuit 102 from ESD events, ESD protection circuits, which can be included in the pad frame 104, are used. Although existing ESD protection schemes are sufficient in some contexts, the ability of existing ESD protection schemes to dissipate ESD energy is commensurate with the number of power supply pads in pad frame 104. This is due to the fact that ESD clamp elements are embedded only with power supply pads in some existing techniques (i.e., ESD clamp elements are not embedded in I/O pads). Unfortunately, if next generation devices require greater ESD protection, this would require a greater number of ESD clamp elements (and correspondingly a greater number of power supply pads on the pad frame 104). Because the number of IC pads is limited on pad frame 104, increasing the number of power supply pads leaves less room for I/O pads. Because each I/O pad helps to provide greater chip functionality and testing, this is less than ideal.

In view of these shortcomings, the present disclosure provides for schemes where energy of an ESD event is not only dissipated by power supply pads, but is also concurrently dissipated over I/O pads. This helps to more efficiently dissipate the ESD event, and at the same time relaxes the number of power supply pads required.

Figure 3:
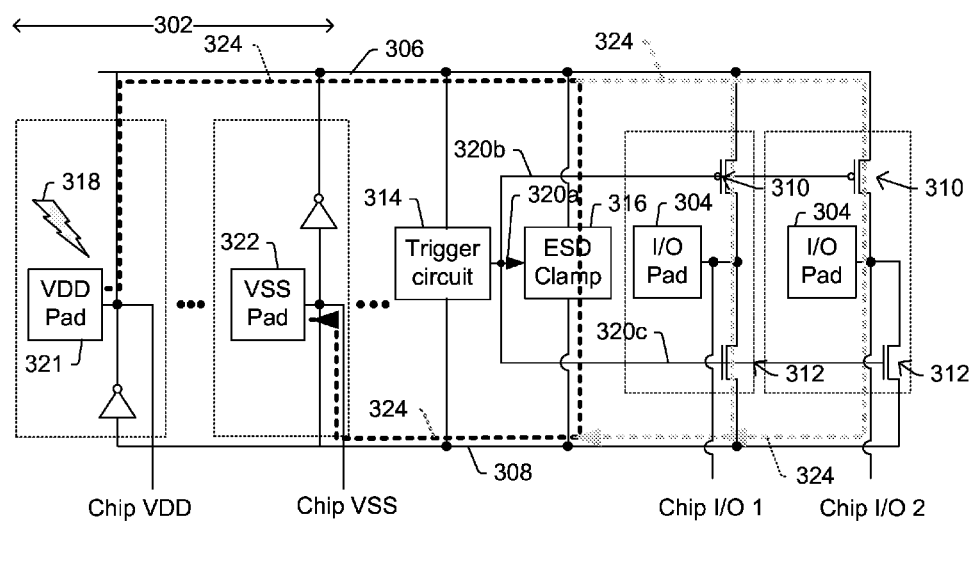
FIG. 3 shows an arrangement of IC pads in accordance with some embodiments.

Turning now to FIG. 3, one can see an example ESD protection circuit 300 in accordance with some embodiments. As shown, the ESD protection circuit 300 can include a number of IC pads, which can include a number of power supply pads 302 and a number of I/O pads 304. The power supply pads can include multiple VDD pads, such as VDD pad 321, and multiple VSS pads, such as VSS pad 322. The IC pads can be arranged in a ladder-like configuration, wherein an upper power rail 306 (e.g., VDD rail) and a lower power rail 308 (e.g., VSS rail) correspond to ladder legs, and the IC pads are arranged on respective ladder rungs. The I/O pads 304 include respective current paths between the power rails 306, 308 and include ESD clamp transistors 310 on each current path. A trigger circuit 314 and an ESD clamp element 316 are also arranged on rungs of the ladder arrangement. The trigger circuit 314 has output terminals coupled to respective input terminals of the power/ground shunt 316, and p-type and n-type transistors on the current paths of I/O pads 304.

During operation, in the absence of an ESD event, trigger circuit 314 provides a set of trigger signals 320a, 320b, 320c. The first trigger signal 320a keeps ESD clamp element 316 in a high impedance state in the absence of ESD event. For example, when the ESD clamp element 316 is a p-type transistor, the first trigger signal 320a can have a voltage level that is greater than a threshold voltage ($V_{TH}$) of the p-type transistor; such that application of the first trigger signal 320a to the gate of the p-type ESD clamp 316 provides a high impedance between its source and drain regions. At the same time, the second trigger signal 320b has a high voltage to put p-type transistors 310 in a high impedance state. At the same time, the third trigger signal 320c puts n-type transistors 312 in high-impedance states, such that the I/O is configured to transfer signals from I/O pads 304 to ESD susceptible chip. Thus, during normal operation, this set of trigger signals keeps the IC pads electrically isolated from one another, and allows them to deliver their respective signals to the ESD susceptible circuit.

If an ESD event is impingent, however, it can cause a sudden energy increase on upper power rail 306. The trigger circuit 314 detects this sudden energy increase, and in response, pulls the trigger signals to a voltage less than VTH to put the p-type ESD clamp 316 and p-type transistors 310 in low impedance states then dissipate the ESD energy. At the same time, the energy of the ESD event 318 flows over the ESD clamp 316 and over the p-type transistors 310, and n-type transistors 312, and over the lower rail 308 and out VSS pad 322, as shown by the dotted arrows 324, which further protects the chip from the ESD event 318.

Because this implementation allows I/O pads to contribute to the dissipation of ESD energy, this implementation can provide increased ESD protection while still allowing more I/O pads than previous implementations. For example, whereas previous implementations may have required an additional power supply pad to help dissipate a given unit of ESD energy, the present implementation allows a designer to use either a power supply pad or an I/O pad to help dissipate the given unit of ESD energy. This is because the present architecture does not limit ESD dissipation to power supply pads, but also allows ESD dissipation to occur over I/O pads. Thus, this architecture is a significant move forward over existing implementations.

Figure 4:
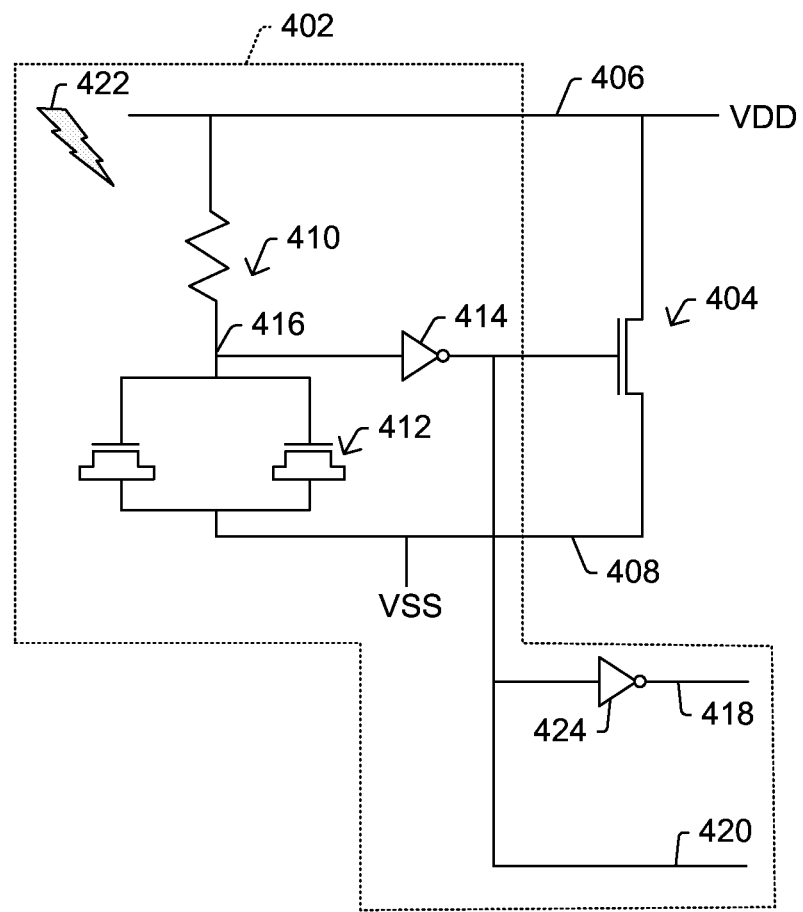
FIG. 4 shows a trigger circuit in accordance with some embodiments.

FIG. 4 shows an example of a trigger circuit 402 and ESD clamp element 404 in accordance with some embodiments. The trigger circuit 402 is coupled between an upper power rail 406 (e.g., VDD rail) and a lower power rail 408, and includes a resistor 410 and one or more MOS capacitors 412. An inverter 414 has its input coupled to an RC node 416 and an output coupled to a gate of the ESD clamp element 404. The output of the inverter is also coupled to two other output terminals 418, 420, which are coupled to one or more p-type transistors (e.g., 310, FIG. 3) and one or more n-type transistors (e.g., 312, FIG. 3) for one or more respective I/O pads.

During operation, in the absence of an ESD event, the MOS capacitors 412 and resistor 410 establish a static high voltage at the RC node 416. Inverter 414 correspondingly inverts this high voltage to provide a low voltage to the gate of the power/ground shunt transistor 404. This low-voltage puts the power/ground shunt transistor 404 in a high impedance state. Thus, the high voltage on the upper rail 406 and low voltage on the lower rail 408 remain isolated during normal (e.g., non-ESD event) operation.

During an ESD event 422, the sudden influx of energy causes the MOS capacitors 412 to act as a short, such that the RC node 416 is pulled low briefly. This correspondingly causes the output of the inverter 414 to go high, thereby activating the n-type shunt transistor 404. Because the n-type shunt transistor 404 is now in a low-resistance state, the energy in ESD event flows from the VDD rail 406 to the VSS rail 408. The output of the inverter 414 is also provided on node 420 to n-type transistors (e.g., 312, FIG. 3) to put these transistors into a low-impedance state. The output of the second inventor 424, which is now a high voltage, is provided to the p-type transistors (e.g., 310, FIG. 3) to put these p-type transistors into a low-impedance state. Thus, the trigger circuit enables power diversion over the ESD clamp element 404, as well as over the current paths of I/O pads. After the ESD event 422 is over, the RC node 416 charges back to the static, relatively low voltage; which re-establishes the high impedance states for the shunt transistor 404 and transistors (e.g., 310, 312, FIG. 3) in the I/O pads. Thus, after the ESD event is over, electrical isolation is re-established between the upper VDD rail 406 and lower VSS rail 408 and normal operation resumes.

Figure 5:
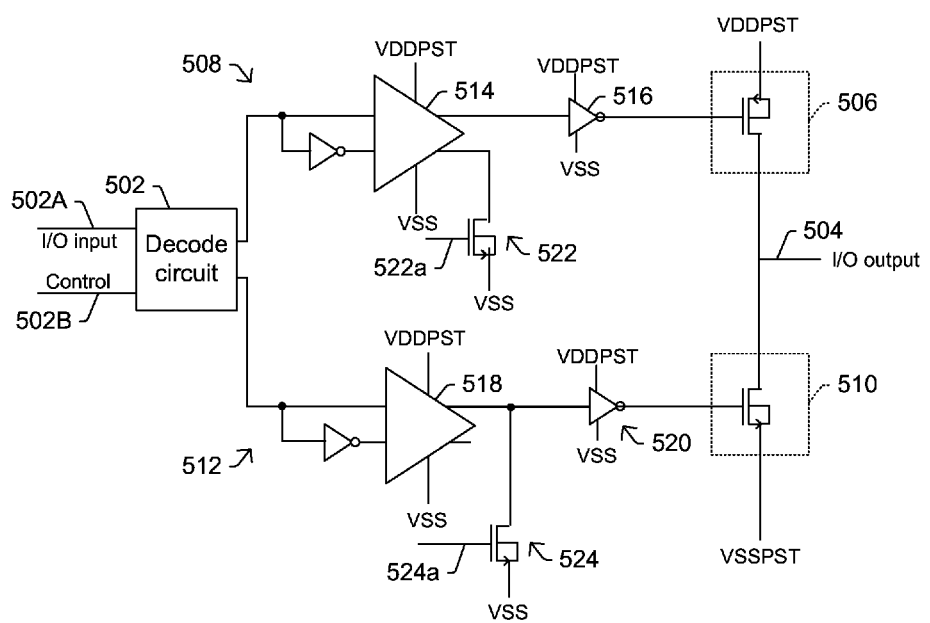
FIG. 5 shows an example of an I/O cell in accordance with some embodiments.

FIG. 5 shows an example of an I/O cell 500, which can as will be described further below be operably coupled to FIG. 4's power clamp cell 400 in some implementations. The I/O cell 500 has a decode circuit 502 which receives an I/O input signal and a control signal on its input terminals 502A, 502B, respectively. The I/O cell 500 also has an I/O output pad 504. The decode circuit 502 is coupled to a gate of p-type transistor 506 via a high-side control path 508, and is also coupled to a gate of n-type transistor 510 via a low-side control path 512. The high-side control path 508 includes a first level-shifter 514 and a first inverter 516, while the low-side control path 512 includes a second level-shifter 518 and a second inverter 520. A first ESD clamp element 522 is coupled to the first level shifter 514 and has its gate 522a coupled to a trigger circuit output node (e.g., node 420 in FIG. 4). Similarly, a second ESD clamp element 524 is coupled to the second level shifter 518 and has its gate 524a coupled to the trigger circuit output node (node 420 in FIG. 4).

During normal operation (i.e., no ESD event present), the p-type and n-type transistors 506, 510 are switched on and off depending on the I/O input signal and control signal provided to the decode circuit 502. For example, if the I/O input is a high voltage signal (e.g., logical "1"), the level shifters 514, 518 can provide a stepped-down version of the logical "1" signal to the inverters 516, 520. The inverters 516, 520 can "flip" the logical "1" to a logical "0" to open the p-type transistor 506 and close the n-type transistor 510, thereby driving the I/O output terminal 504 to a logical "1" value. Similarly, if a low-voltage (logical "0") is provided to the I/O input terminal 502, the n-type transistor 510 is opened to drive the I/O output terminal to a logical "0". Because the trigger circuit is off, the ESD clamp elements 522, 524 are off or high impedance during normal operation.

In contrast, during an ESD event, the trigger circuit 402 in FIG. 4 will generate an increased voltage on node 420, wherein the magnitude of this increased voltage is greater than a threshold voltage for transistors 522, 524. Because node 420 is coupled to terminals of ESD clamp elements 522, 524, the n-type ESD clamp transistors 522, 524 are enabled at this point. Thus, power of the impingent ESD pulse will be shunted from the control paths 508, 512 by the ESD clamp elements 522, 524 to prevent or limit damage from the impingent ESD pulse.

Some embodiments relate to an IC that includes an ESD-susceptible circuit. The IC includes a number of IC pads that are electrically coupled to respective nodes on the ESD-susceptible circuit. The IC pads are electrically accessible from external to the IC, and include one or more power supply pads and one or more I/O pads. The IC also includes a number of ESD protection devices coupled to the plurality of IC pads, respectively. A trigger circuit on the IC is configured to detect an ESD event impingent on a power supply pad and, in response to the detection, to trigger shunting of energy of the ESD event over an ESD protection device of an I/O pad.

Some embodiments relate to an integrated circuit (IC) including an electrostatic discharge (ESD) protection circuit having a ladder-like configuration. A first power rail corresponds to a first leg of the ladder-like configuration, and a second power rail corresponds to a second leg of the ladder-like configuration. A number of current paths extend in parallel with one another so as to correspond to respective rungs of the ladder-like configuration. A number of IC pads are arranged on respective current paths, wherein the IC pads include one or more power supply pads and one or more I/O pads. A trigger circuit detects if an ESD event is impingent, and if an ESD event is impingent, the trigger circuit triggers shunting of energy of the ESD event over a power supply pad and an I/O pad concurrently.

It will be appreciated that identifiers such as "first" and "second" do not imply any type of ordering or placement with respect to other elements; but rather "first" and "second" and other similar identifiers are just generic identifiers. In addition, it will be appreciated that the term "electrically connected" includes direct and indirect connections. For example, if element "a" is electrically connected to element "b", element "a" can be electrically connected directly to element "b" and/or element "a" can be electrically connected to element "b" through element "c", so long as there is an operable electrical connection between elements "a" and "b".

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. An integrated circuit (IC), comprising:
   an electrostatic-discharge (ESD)-susceptible circuit;
   a plurality of IC pads that are electrically coupled to respective nodes on the ESD-susceptible circuit and which are electrically accessible from external to the IC, wherein the plurality of IC pads include one or more power supply pads and one or more I/O pads;
   a plurality of ESD clamp elements coupled to the plurality of IC pads, respectively;
   a first power rail extending between a first supply terminal of a first power supply pad and a first supply terminal of an I/O pad;
   a second power rail extending between a second supply terminal of the first power supply pad and a second supply terminal of the I/O pad;
   a current path coupled between the first and second power rails and coupled to the I/O pad;
   wherein an ESD clamp element of an I/O pad includes a first transistor arranged on the current path and coupled between the I/O pad and the first power rail, and wherein the ESD clamp element of the I/O pad further includes a second transistor arranged on the current path and coupled between the I/O pad and the second power rail; and
   a trigger circuit configured to detect an ESD event by monitoring a current or voltage between first and second power supply pads and, in response to the detection, to trigger concurrent shunting of energy of the ESD event over both the ESD clamp element of the I/O pad and an ESD clamp element of the power supply pad;
   wherein a gate of the first transistor is directly connected to a first output terminal of the trigger circuit and wherein a gate of the second transistor is directly connected to a second output terminal of the trigger circuit;
   wherein the first and second power supply pads are VDD and VSS pads, respectively.

2. The IC of claim 1, wherein the trigger circuit is adapted to put the first transistor into a low-resistance state when the ESD event is impingent.

3. The IC of claim 1, wherein the trigger circuit is adapted to put the second transistor into a low-impedance state when the ESD event is impingent.

4. The IC of claim 1, wherein the ESD clamp element of the first power supply pad comprises a transistor and wherein the trigger circuit is adapted to put the transistor of the first power supply pad in a low-resistance state when the ESD event is impingent.

5. The IC of claim 4, wherein the trigger circuit is adapted to put the transistor of the first power supply pad in a high-resistance state in the absence of an ESD event.

6. The IC of claim 1, wherein the trigger circuit comprises:
   a resistor;
   one or more MOS capacitors coupled to a terminal of the resistor to establish an RC node; and
   an inverter having an input coupled to the RC node and having an output terminal coupled to the ESD clamp element of the first power supply pad.

7. An integrated circuit (IC), comprising:
   an electrostatic-discharge (ESD)-susceptible circuit;
   a plurality of IC pads that are electrically coupled to respective nodes on the ESD-susceptible circuit and which are electrically accessible from external to the IC, wherein the plurality of IC pads include one or more power supply pads and one or more I/O pads;
   a plurality of ESD clamp elements coupled to the plurality of IC pads, respectively;
   a first power rail extending between a first supply terminal of a first power supply pad and a first supply terminal of an I/O pad;
   a second power rail extending between a second supply terminal of the first power supply pad and a second supply terminal of the I/O pad;
   a current path coupled between the first and second power rails and coupled to the I/O pad;
   wherein an ESD clamp element of an I/O pad includes a first transistor arranged on the current path and coupled between the I/O pad and the first power rail, and wherein the ESD clamp element of the I/O pad further includes a second transistor arranged on the current path and coupled between the I/O pad and the second power rail; and
   a trigger circuit configured to detect an ESD event by monitoring a current or voltage between first and second power supply pads and, in response to the detection, to trigger concurrent shunting of energy of the ESD event over both an ESD clamp element of an I/O pad and an ESD clamp element of the power supply pad;
   wherein the first and second power supply pads are VDD and VSS pads, respectively;
   wherein the trigger circuit comprises:
   a first terminal configured to output a first trigger signal to the first transistor; and
   a second terminal configured to output a second trigger signal to the second transistor; and a third terminal configured to output a third trigger signal to an ESD clamp element of the first power supply pad.

8. An integrated circuit (IC) including an electrostatic discharge (ESD) protection circuit having a ladder-like configuration, comprising:
    a first power rail corresponding to a first leg of the ladder-like configuration;
    a second power rail corresponding to a second leg of the ladder-like configuration;
    a plurality of current paths extending in parallel with one another so as to correspond to respective rungs of the ladder-like configuration;
    a plurality of IC pads arranged on respective current paths, wherein the plurality of IC pads include one or more power supply pads and one or more I/O pads; and
    a plurality of ESD clamp elements coupled to the plurality of IC pads, respectively, and arranged on the respective current paths, wherein an ESD clamp element of an I/O pad includes a first and second transistors in series between the first and second power rails, wherein a source/drain region of the first transistor is coupled to a source/drain region of the second transistor and is also directly coupled to the I/O pad;
    a trigger circuit to detect if an ESD event is impingent, and if an ESD event is impingent, to trigger concurrent shunting of energy of the ESD event over both a current path corresponding to a power supply pad and a current path corresponding to the I/O pad.

9. The IC of claim 8, wherein the ESD clamp elements are configured to shunt energy of the ESD event impingent on the power supply pad under control of the trigger circuit.

10. The IC of claim 9, wherein the trigger circuit is configured to put the ESD clamp elements in a low impedance state when the ESD event is impingent, and is further configured to put the ESD clamp elements in a high impedance state in the absence of an ESD event.

11. The IC of claim 8, wherein the first transistor is a p-type transistor coupled between the first power rail and the I/O pad; and
    wherein the second transistor is an n-type transistor coupled between the I/O pad and the second power rail.

12. The IC of claim 11, wherein the trigger circuit is adapted to put the p-type transistor into a low resistance state and concurrently put the n-type transistor into a low impedance state when the ESD event is impingent.

13. The IC of claim 12, wherein the trigger circuit is adapted to put the p-type transistor into a high resistance state and concurrently put the n-type transistor into a high-impedance state in the absence of an ESD event, wherein the n-type transistor and p-type transistor are configured as an output buffer in the absence of an ESD event.

14. The IC of claim 13, further comprising:
    an ESD clamp element of the power supply pad configured to shunt energy of an ESD event impingent on the power supply pad under direction of the trigger circuit.

15. The IC of claim 14, wherein the trigger circuit comprises:
    a first terminal configured to output a first trigger signal to the ESD clamp element;
    a second terminal configured to output a second trigger signal to the p-type transistor; and
    a third terminal configured to output a third trigger signal to the n-type transistor.

16. The IC of claim 8, wherein the first and second transistors have respective gates that are coupled to an output of the trigger circuit.

17. An integrated circuit (IC), comprising:
    an electrostatic-discharge(ESD)-susceptible circuit;
    a plurality of IC pads that are electrically coupled to respective nodes on the ESD-susceptible circuit and which are electrically accessible from external to the IC, wherein the plurality of IC pads include one or more power supply pads and one or more I/O pads;
    a first power rail extending between a first supply terminal of a power supply pad and a first supply terminal of an I/O pad;
    a second power rail extending between a second supply terminal of the power supply pad and a second supply terminal of the I/O pad;
    a first transistor coupled on a first current path extending between the first power rail and the I/O pad;
    a second transistor coupled on the first current path extending between the I/O pad and the second power rail, wherein the I/O pad is coupled directly to source/drain regions of the first and second transistors; and
    a trigger circuit configured to detect an ESD event impingent on the power supply pad and, in response to the detection, to alter a voltage or voltages provided to gates of the first and second transistors to trigger concurrent shunting of energy of the ESD event over both an ESD clamp element of the power supply pad and a ESD clamp element of the I/O pad.

18. An integrated circuit (IC), comprising:
    an electrostatic-discharge (ESD)-susceptible circuit;
    a plurality of IC pads that are electrically coupled to respective nodes on the ESD-susceptible circuit and which are electrically accessible from external to the IC, wherein the plurality of IC pads include one or more power supply pads and one or more I/O pads;
    a plurality of ESD clamp elements coupled to the plurality of IC pads, respectively; and
    a trigger circuit configured to detect an ESD event by monitoring a current or voltage between first and second power supply pads and, in response to the detection, to trigger concurrent shunting of energy of the ESD event over both an ESD clamp element of an I/O pad and an ESD clamp element of the power supply pad;
    wherein power rails couple respective power supply pads to respective nodes of the ESD-susceptible circuit; and
    wherein an ESD clamp element of the I/O pad includes first and second transistors in series between first and second power rails, wherein a source/drain region of the first transistor is coupled to a source/drain region of the second transistor and is also directly coupled to the I/O pad.

* * * * *